(12) United States Patent
Malfliet et al.

(10) Patent No.: US 7,192,543 B2
(45) Date of Patent: Mar. 20, 2007

(54) METHOD AND MOULD FOR MANUFACTURING A MOULDED ARTICLE COMPRISING AT LEAST AN ELASTOMERIC POLYURETHANE SKIN

(75) Inventors: Guy Malfliet, Wetteren (BE); Hugo De Winter, Wetteren (BE); Jan Willems, Wetteren (BE)

(73) Assignee: Recticel, Brussels (BE)

( * ) Notice: Subject to any disclaimer, the term of this patent is extended or adjusted under 35 U.S.C. 154(b) by 249 days.

(21) Appl. No.: 10/381,423

(22) PCT Filed: Sep. 25, 2001

(86) PCT No.: PCT/BE01/00165

§ 371 (c)(1),
(2), (4) Date: Jul. 8, 2003

(87) PCT Pub. No.: WO02/26461

PCT Pub. Date: Apr. 4, 2002

(65) Prior Publication Data

US 2004/0089965 A1   May 13, 2004

(30) Foreign Application Priority Data

Sep. 26, 2000   (EP) ................................. 00870216

(51) Int. Cl.
*B29C 44/12* (2006.01)
*B29C 44/58* (2006.01)

(52) U.S. Cl. ...................... 264/45.5; 264/51; 264/313; 264/316; 264/318

(58) Field of Classification Search .................... None
See application file for complete search history.

(56) References Cited

U.S. PATENT DOCUMENTS

| 3,844,523 A | * | 10/1974 | Wilheim ..................... 425/113 |
| 4,123,494 A | * | 10/1978 | Evrard et al. ............... 264/258 |
| 4,218,543 A | * | 8/1980 | Weber et al. ................. 521/51 |
| 4,389,454 A | * | 6/1983 | Horacek et al. ......... 428/318.6 |
| 4,544,518 A | * | 10/1985 | Lindskog .................... 264/257 |

(Continued)

FOREIGN PATENT DOCUMENTS

GB        1035365        7/1966

(Continued)

*Primary Examiner*—Mark Eashoo
(74) *Attorney, Agent, or Firm*—Sughrue Mion, PLLC

(57) ABSTRACT

For manufacturing a moulded article comprising at least an elastomeric polyurethane skin (9) and optionally a structural backing layer (10) and an intermediate foam layer (12) a mould is used having at least a first mould part (1) comprising at least two mutually movable mould sections (2-4). The skin (9) is moulded with its front against a surface (7) of the first mould part (1) by applying at least one reactive polyurethane mixture to this mould surface. In order to prevent the seam between the mutually movable mould sections (2-4) of the first mould part to leave traces on the front of the moulded skin (9), the first mould part (1) further comprises a removable, flexible liner (6) which is positioned onto these mould sections to cover at least partially the seam therebetween. Since the first mould part (1) comprises mutually movable mould sections (2-4), the design freedom is increased and it is not required to transfer the skin to another mould for providing relatively rigid backing layers to the back of this skin.

31 Claims, 5 Drawing Sheets

U.S. PATENT DOCUMENTS

| | | | |
|---|---|---|---|
| 5,110,834 A * | 5/1992 | Horn et al. | 521/52 |
| 5,176,922 A * | 1/1993 | Balsano et al. | 425/89 |
| 5,437,822 A * | 8/1995 | Wada et al. | 264/45.5 |
| 5,662,996 A * | 9/1997 | Jourquin et al. | 428/318.8 |
| 6,730,247 B2 * | 5/2004 | De Winter et al. | 264/45.5 |

FOREIGN PATENT DOCUMENTS

| | | |
|---|---|---|
| WO | WO 93/23237 A1 | 11/1993 |

* cited by examiner

METHOD AND MOULD FOR MANUFACTURING A MOULDED ARTICLE COMPRISING AT LEAST AN ELASTOMERIC POLYURETHANE SKIN

BACKGROUND OF THE INVENTION

The present invention relates to a method for manufacturing a moulded article, in particular an automotive vehicle's part, comprising at least an elastomeric polyurethane skin showing a front and a back, which method comprises the steps of:
- providing a mould with at least a first mould part comprising at least two mutually movable mould sections forming at least one seam;
- applying at least one reactive polyurethane mixture to a surface of said first mould part to mould said skin with its front against this mould surface;
- moving the mutually movable mould sections away from one another; and
- removing the moulded article from the mould.

In practice, mould parts consisting of mutually movable mould sections are used to increase the design freedom of the moulded articles. They allow in particular to manufacture relatively rigid or stiff moulded articles in moulds showing so-called undercuts. A drawback of the use of such moulds for moulding the skin or front surface of the moulded article is that the finishing degree of the seam between the mould sections is of utmost importance and may result in an optically not qualitative article showing traces of the seam between the mould sections.

In order to avoid this drawback, the skin can be made in a first mould and subsequently transferred to another mould wherein the further backing layers are applied. Such a method is for example disclosed in WO93/23237. When the skin is sufficiently flexible and when the opening of the first mould is sufficiently wide, the skin can be demoulded, even when the mould shows undercuts, without having to use mutually movable mould sections or so-called slides. The second mould, wherein the more rigid backing layers are applied, is then provided with the necessary movable mould sections or slides. A drawback of this known method is however that the design freedom is still somewhat limited. It allows for example not to provide a greater skin thickness in certain area's of the skin which would make the skin too stiff to demould it or to make a three dimensional skin extending in cross-section over a large angle so that the mould part shows only a relatively narrow cavity through which the skin has to be demoulded. A further disadvantage of the known method is that, in the case of undercuts, it does not enable to mould the entire article, including the backing layers, in one single mould (as illustrated for example in FIG. 1 of WO93/23237) so that the skin moulded in the first mould has to be transferred to a second mould. Of course, when such a transfer step could be avoided, this would reduce the manufacturing costs, not only because less handling steps would be required but also because less skin material would be required since in area's of the article which are cut out later to insert different inserts, no skin or backing material has to be applied.

SUMMARY OF THE INVENTION

An object of the present invention is therefore to provide a new method for manufacturing a moulded article comprising at least an elastomeric polyurethane skin which enables to provide a similar design freedom than the known moulding methods wherein moulds with mutually movable mould sections are used but which solves the problems of the traces which may be left by the seams between the movable mould sections on the visible surface of the moulded article.

To this end, the method according to the invention is characterised in that said first mould part further comprises a removable, flexible liner made of an elastic material which is positioned onto said mould sections to form at least a portion of said mould surface and to cover at least partially said seam.

Since the seam between the mutually movable mould sections is covered by the liner, it does not leave traces on the outer surface of the moulded article. Moreover, due to the fact that the liner is flexible, it can be removed from the moulded article, even if it shows undercuts.

Providing a silicone mould showing the negative configuration of the article to be moulded in a mother mould is already known per se from U.S. Pat. No. 5,747,167 and U.S. Pat. No. 5,938,993. According to U.S. Pat. No. 5,747,167, the silicone mould was intended to reduce the tooling costs required to produce interior parts such as dash boards by injection moulding. Neither U.S. Pat. No. 5,747,167 nor U.S. Pat. No. 5,938,993 teaches however the use of a flexible, removable liner for covering seams between mutually movable mould parts. In fact, the mother mould carrying the silicone mould part consists of one single part. When the mould shows undercuts as illustrated in the figures of U.S. Pat. No. 5,938,993, the moulded article cannot be demoulded unless it is a sufficiently flexible article such as for example the disclosed cushion.

In a preferred embodiment of the method according to the invention, the step of removing the moulded article from the mould comprises the step of removing the moulded article together with the flexible liner from the mutually movable mould sections and the step of removing the flexible liner from the moulded article.

By first removing the moulded article together with the liner out of the mould, the liner can easily be removed from the moulded article. For moulding a next article, the liner can then be positioned again onto the mutually movable mould sections.

The present invention also relates to a mould for use in the method according to the invention showing at least a first mould part which forms a mould surface against which said skin is moulded and which comprises at least two mutually movable mould sections forming at least one seam. The mould of the invention is characterised in that said first mould part further comprises a removable, flexible liner made of an elastic material which is optionally grained on its side against which the skin is moulded and which is positioned onto said mould sections to form at least a portion of said mould surface and to cover at least partially said seam.

BRIEF DESCRIPTION OF THE DRAWINGS

Further advantages and particularities of the invention will become apparent from the following description of some particular embodiments of the method and the mould according to the invention. This description is only given by way of illustrative example and is not intended to limit the scope of the invention as defined by the annexed claims. The reference numerals used in the description refer to the drawings wherein:

FIGS. 1 to 8 illustrate schematically the different step of a method according to the invention for manufacturing a moulded article, in particular a dashboard comprising an outer polyurethane skin layer, an intermediate foam layer and a structural backing layer; wherein FIG. 9 is similar to FIG. 3 but relates to a variant embodiment of the flexible liner positioned on the mutually movable mould sections of the lower mould part; wherein FIG. 10 shows a variant embodiment of the liner illustrated in the previous figures; and wherein

DETAILED DESCRIPTION OF THE INVENTION

Figure 1:
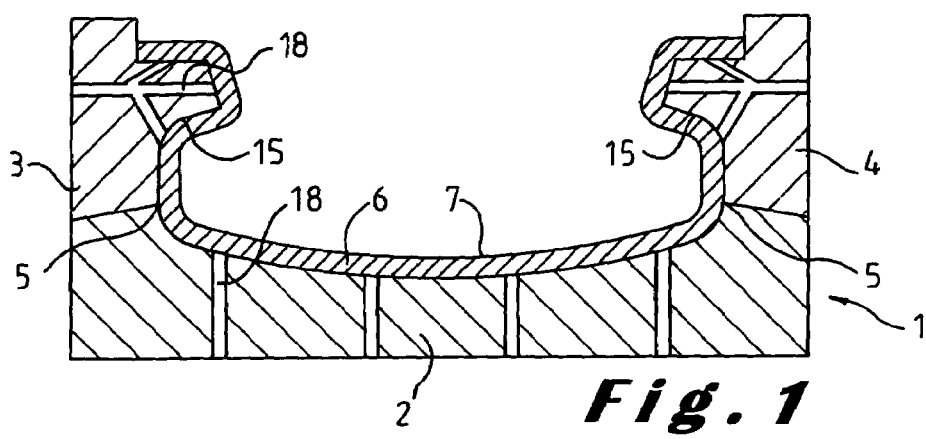

In general, the present invention provides a new method for manufacturing moulded articles which comprise an elastomeric polyurethane skin intended to form the front side of the article. The moulded articles are for example interior trim parts of automotive vehicles such a dashboards or instrument panels, door covers, consoles and glove compartments. In addition to the polyurethane skin, they usually contain a structural backing layer or rigid carrier which may be united either directly to the back of the skin or through the intermediary of a foam layer in order to achieve a soft touch.

In practice, the interior trim parts are often to be produced in moulds comprising slides, or in other words mutually movable mould sections, as a result of the complex shape of the trim parts and especially the presence of undercuts. When traces or imprints of the seams between the mutually movable mould sections are to be avoided on the visible side of the trim part, the skin was hitherto to be made in a separate mould comprising a relatively expensive single piece nickel or galvano scale and was subsequently to be transferred to a second mould with mutually movable mould sections.

In the method according to the present invention, illustrated in FIGS. 1 to 8, visible traces or imprints of the seams between the mutually movable mould sections are however avoided without having to use a mould showing a one-piece mould surface. The lower mould part 1 illustrated in FIG. 1 and used to mould the polyurethane skin and optionally the further backing layers, comprises for example three mutually movable mould sections including one basic mould section 2 and two so-called slides 3, 4. These mould sections 2-4 form a mould surface showing a generally concave shape and undercuts 15. In order to be able to demould the moulded article, the slides 3, 4 can be retracted to the position illustrated in FIG. 5. In the closed position, the different mutually movable mould sections 2-4 abut each other along seams 5. Since such a mould construction is already known by the skilled person, the mechanical connection between the different mould sections 2-4 and the mechanism for mutually moving these sections will not be described in further detail.

Figure 11:
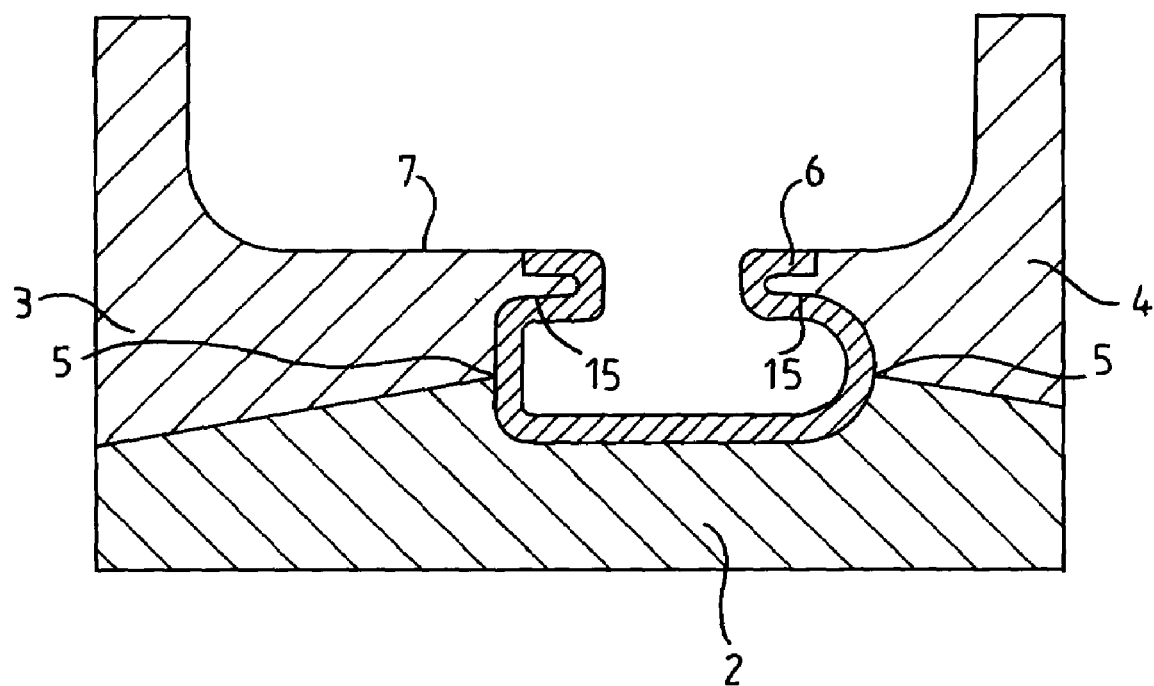
FIG. 11 shows a variant embodiment of the lower mould part which is only partially covered with a flexible liner.

An essential feature of the method according to the invention is that the mould part 1 does not only comprise the mutually movable mould sections 2-4 but also a removable, flexible liner 6 made of an elastic material. This liner 6 is positioned on the mould sections 2-4 to form at least a portion of the mould surface 7 and to cover at least partially the seams 5 between the mutually movable mould sections 2-4. In the example illustrated in FIG. 1, the liner 6 forms the entire mould surface 7 of the lower mould part 1 and covers therefore the seams 5 completely. However, in other cases, the liner 6 could only cover a portion of the mould sections 2-4, the transition between the mould surface formed by the liner and the mould surface formed by the uncovered mould sections 2-4 being situated in an area which is either cut out afterwards or which is covered with an insert or other covering. An example of such a mould, comprising also one basic mould section 2 and two so-called slides 3, 4 is illustrated in FIG. 11.

Since the flexible liner 6 forms at least a portion of the mould surface against which the article is moulded by spraying in an open mould or by injecting or pouring in a closed mould, the surface characteristics of this article, in particular the texture or grain, usually a leather texture, will be determined by the texture or grain of the liner surface 7. The liner is preferably pre-shaped in accordance with the shape of the visible front side of the skin or the article which is to be moulded. In practice, different techniques exist for producing such a liner 6. First of all, it is possible to produce the liner by thermoforming a sheet of thermoplastic material. In such a thermoforming process, the sheet is formed against a mould surface so that it receives the desired shape and surface structure or texture. Another, more preferred way to produce the liner 6 is to mould the liner in a closed mould starting from a liquid hardenable material such as liquid silicone or a thermoplastic material. This can be done in a separate closed mould comprising a lower mould part which is substantially identical to the lower mould part 1 illustrated in FIG. 1 and an upper mould part which fits in the lower mould part and which has the shape and the surface grain and texture of the article which is to be moulded. Such a technique is for example disclosed in U.S. Pat. No. 5,747,167 and U.S. Pat. No. 5,938,993 which are incorporated herein by way of reference. In these US patents, use is made of a master piece formed by an object desired to be reproduced to produce the silicone liners. In the method according to the present invention, the flexible liner is however preferably moulded against a nickel or more generally a galvano mould surface. The production of such galvano mould surfaces is known in practice, starting for example from a leather wrapped model, to produce mould surfaces against which skins can be moulded. For the method according to the present invention, an additional intermediate moulding step is however required to achieve a positive nickel core (against which the negative flexible liner is to be moulded) instead of a negative nickel scale.

Figure 10:
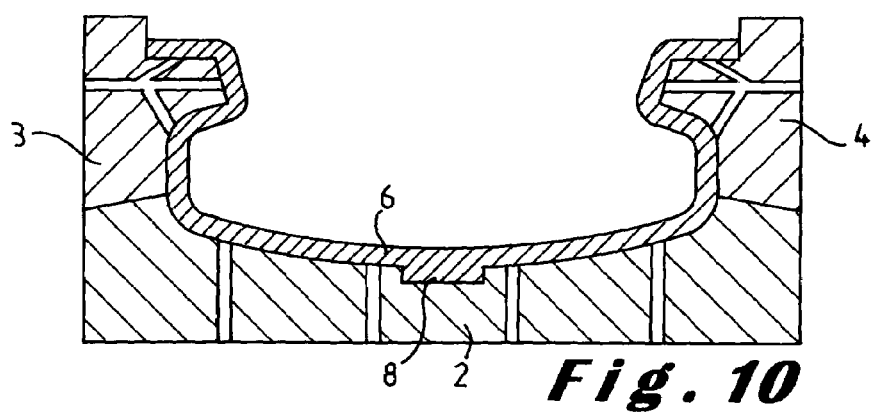

The liner has an average thickness which will usually be situated between 0.03 mm and 15 mm and preferably between 0.05 and 5 mm. When the visual quality of the article needs not to be really outstanding, the average thickness of the flexible liner could be smaller than 0.03 mm or larger than 15 mm, for instance when another material such as leather will be glued on the front surface of the article. The average thickness of the liner is determined by measuring its volume and by dividing this volume by its area forming the mould surface. Larger thicknesses being preferred, for example a thickness of between 2 and 5 mm in view of making positioning the liner in the lower mould part 1 easier. However, as illustrated in FIG. 10, one or more local projections or thickenings 8 fitting into corresponding recesses in the mutually movable mould sections 2-4 can also make the exact positioning of the liner in the lower mould part 1 easier.

For maintaining the liner 6 against the surface of the mould sections 2-4, and optionally for conforming the shape of the flexible liner 6 to the shape of the surface of these mould sections 2-4, the liner is preferably sucked by a vacuum applied through openings 18 distributed over the surface of the mould sections 2-4 against this surface.

Figure 2:
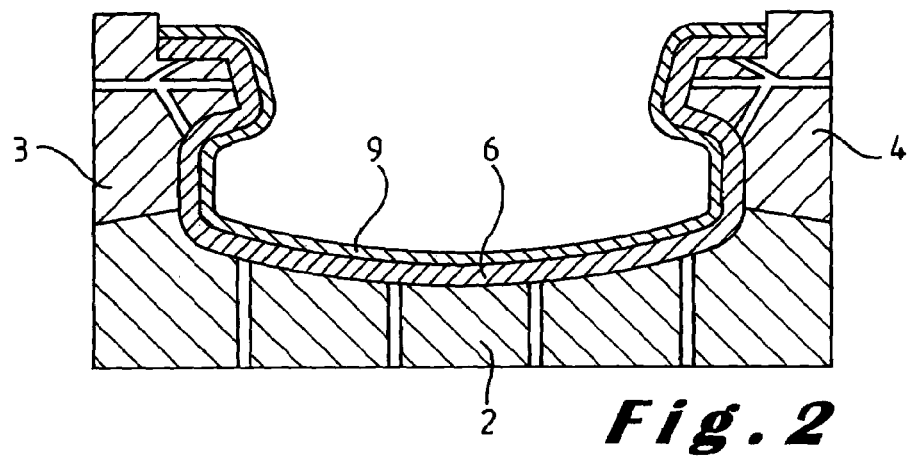

After having positioned the flexible liner 6 in the mould, a reactive polyurethane mixture is applied to the mould surface 7 to mould the elastomeric polyurethane skin 9, as illustrated in FIG. 2, with its front against this mould surface. The skin 9 has normally an average thickness in the range of 0.1 to 3 mm and usually in the range of 0.5 to 1.5 mm. In certain areas such as corners the actual skin thickness may however differ considerable from these values. Different techniques exist for moulding the polyurethane skin 9.

First of all, the reactive polyurethane mixture can be sprayed against the mould surface 7, in particular in accordance with the technique described in EP-B-0 303 305. Use can be made of a light-stable polyurethane reaction mixture as disclosed for example in EP-B-0 379 246. However, in a variant embodiment, an in-mold coating can first be applied to the mould surface, in particular a water or solvent-based paint coating. In this case, the skin material applied against the back of this coating does not necessarily have to be light-stable so that for example also aromatic polyurethane systems can be used for the skin 9.

Instead of spraying the polyurethane skin material against an open mould surface, it can also be applied by pouring or injecting, in particular in accordance with a reaction injection moulding (RIM) process, in a closed mould. In this case, a second upper mould part has of course to be provided to form the closed mould cavity. Specific reactive polyurethane mixtures which can be used for a RIM process are disclosed in WO98/14492. However, in this embodiment also, an in-mold coating or paint can first be applied to the mould surface so that the material of the skin itself does not have to be light-stable.

In the previous embodiments, the reactive polyurethane mixture did not contain blowing agents or only a small amount thereof so that a non-cellular or micro-cellular skin was obtained having a density which is usually higher than 400 kg/m$^3$ and preferably higher than 700 kg/m$^3$. When the skin 9 is produced in a closed mould, it is however possible to include a blowing agent in the polyurethane formulation in order to produce a polyurethane foam showing an integral elastomeric polyurethane skin.

After having moulded the skin 9, it can be removed from the mould and used to produce the moulded article, in particular the interior trim part. During this further processing, different backing layers can be applied to the elastomeric skin, for example a rigid structural backing layer which can be glued or bonded directly to the back of the skin or indirectly, through the intermediary of a foam layer, foamed between the skin and the structural backing layer. This structural backing layer may be a rigid polyurethane layer, obtained for example by an S-RIM (Structural RIM, insertion of glass fibre mat), R-RIM (Reinforced RIM, glass or other fibres admixed into the polyurethane reaction mixture) or LFI (Long Fibre Injection) or similar process, or it may be made of a rigid thermoplastic material such as PVC, ABS and SMA.

An advantage of the method according to the present invention is however that such backing layers, which render the moulded article more rigid or stiff, can also be provided in the mould wherein the skin is moulded.

Figure 3:
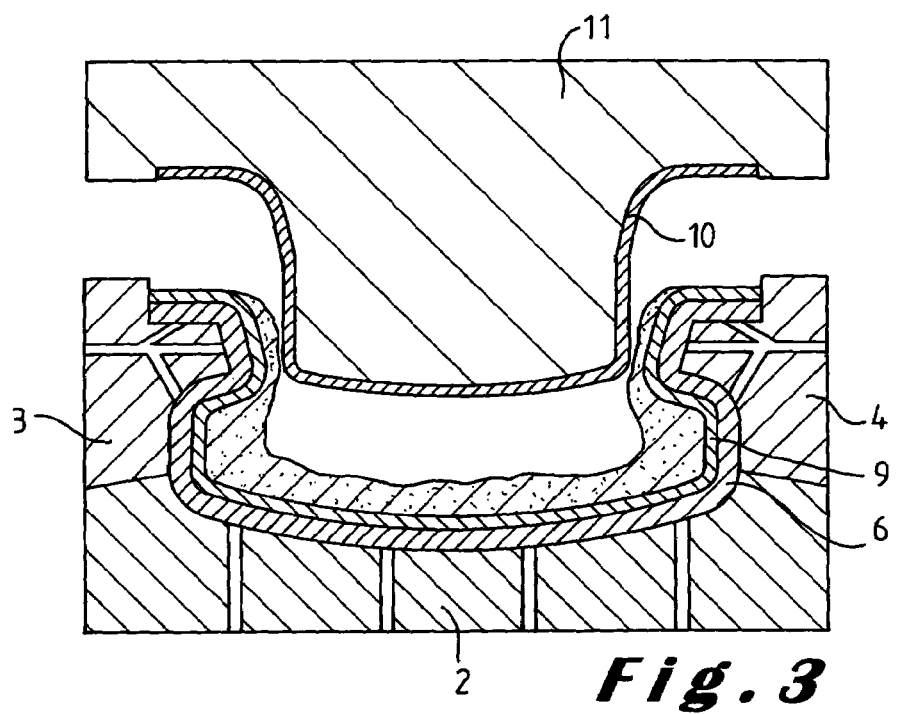
Figure 4:
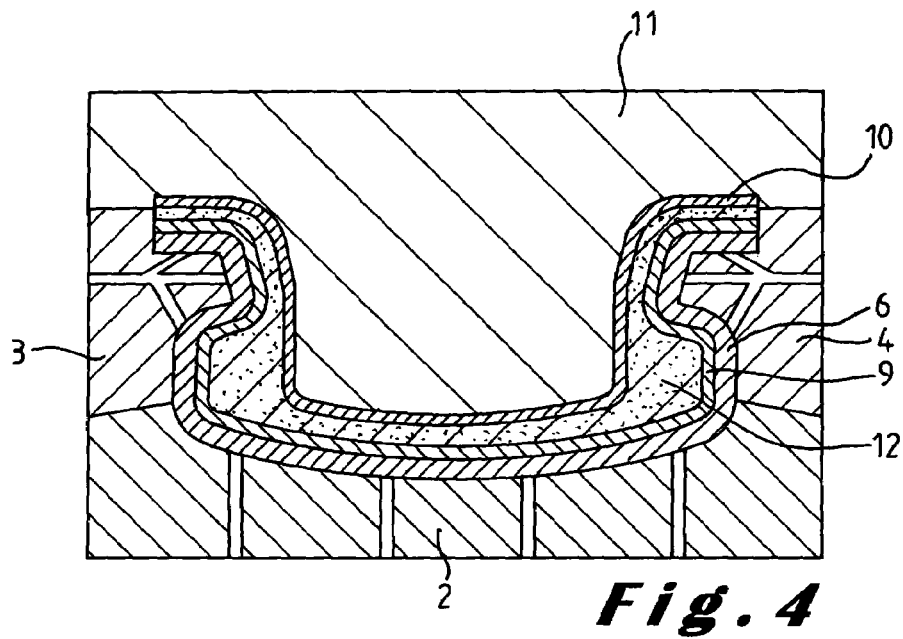

FIG. 3 illustrates for example the further step wherein a structural backing layer or rigid carrier 10 is attached to an upper mould part 11 and wherein a foamable composition is poured onto the back of the skin 9 before closing the mould. The closed position of the mould is illustrated in FIG. 4. In this position, the foamable composition has foamed to fill the mould cavity with a foam layer 12 and to unite the structural backing layer 10 to the back of the skin 9. Instead of pouring the foamable composition in the open mould, it could also be injected, in particular in accordance with a RIM process, in the closed mould. The foam layer is preferably made of a polyurethane material.

In a further variant embodiment, the foam layer 12 could be sprayed against the back of the skin layer 9. In a subsequent step, a reactive mixture for obtaining a structural backing layer can then be sprayed against the back of the foam layer or the mould can be closed and the reactive mixture for obtaining the structural backing layer can be injected in this closed mould, at the back side of the foam layer. Just as the foam layer, the structural backing layer is preferably made of a polyurethane material. For more details with respect to the way wherein the different backing layers can be applied in this embodiment and with respect to the composition thereof, reference is made to WO93/23237.

In still a further variant embodiment, the intermediary foam layer can optionally be omitted and the structural backing layer can be sprayed or moulded, in particular by a RIM process such as more particularly an S-RIM, an R-RIM or an LFI or similar process, directly against the back of the skin. In this embodiment, the rigid backing layer does not necessarily have to be a polyurethane material but it may also be made of a thermoplastic material injected, as disclosed in WO 00/23239, in molten state against the back of the polyurethane skin layer 9. These thermoplastic materials comprise for example polypropylene (PP), polycarbonate (PC), acrylnitrilbutadiene-styrol (ABS), ABS blends, acrylester-styrol-acrylnitril (ASA), polystyrol (PS), thermoplastic polyurethane (TPU) or mixtures thereof or mixtures of any of these components with still other thermoplastic materials.

Figure 5:
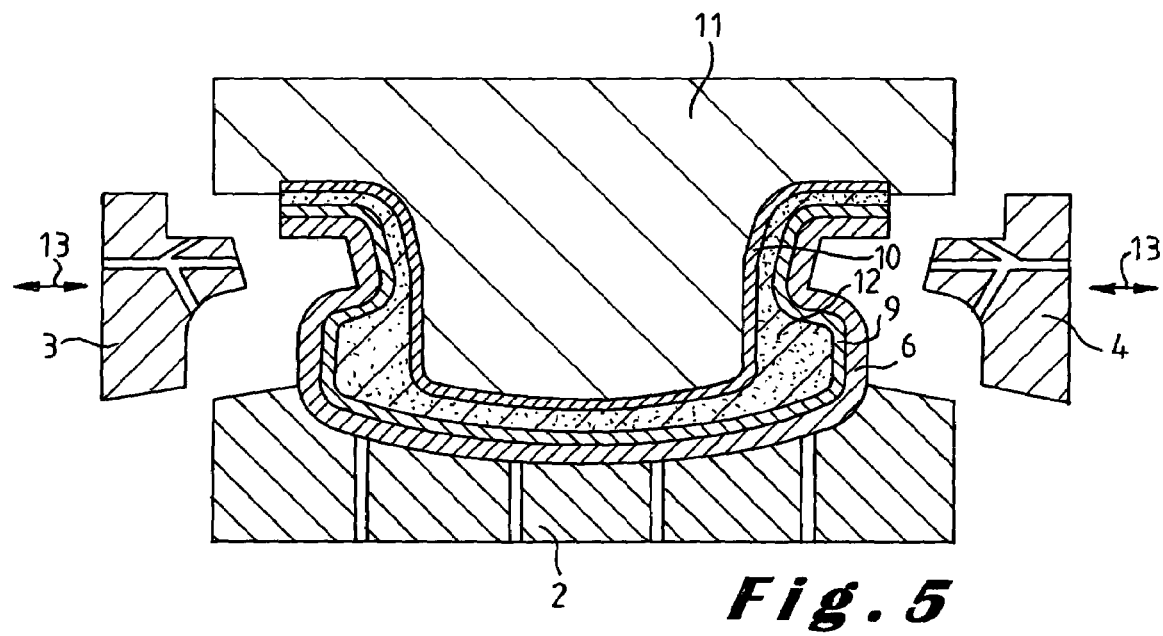
Figure 6:
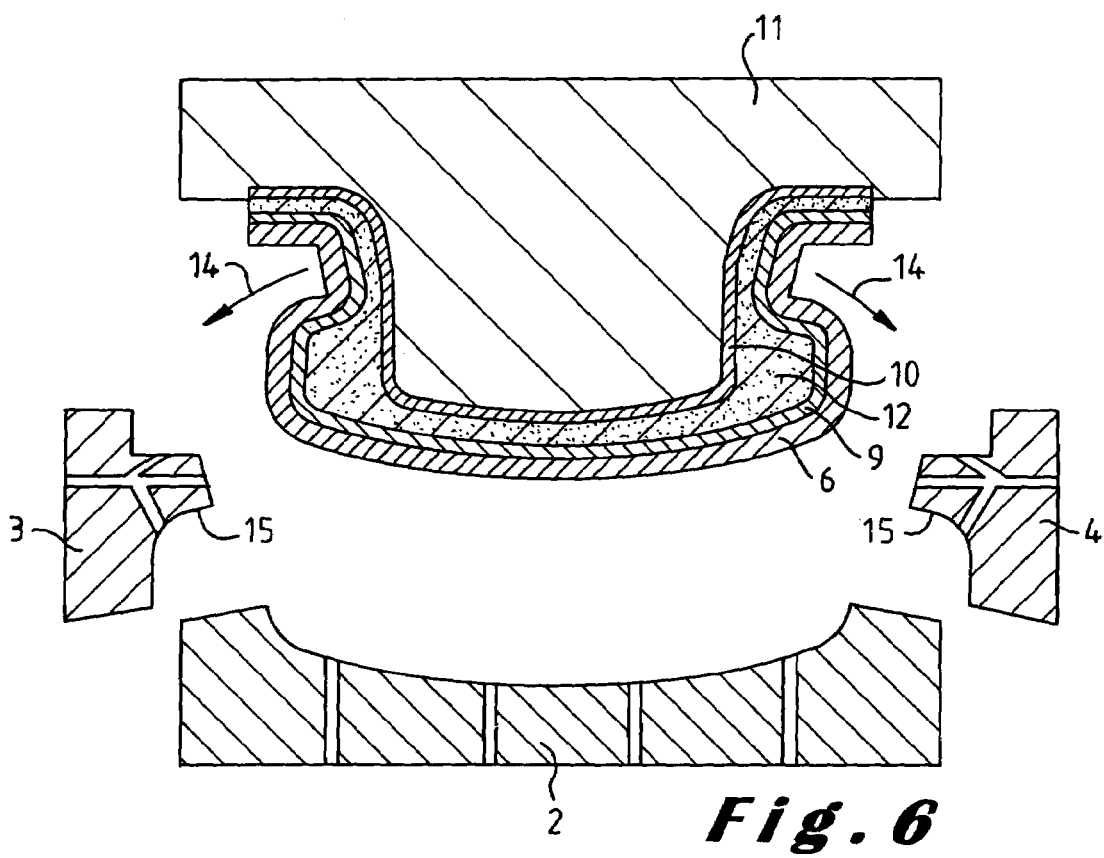
Figure 7:
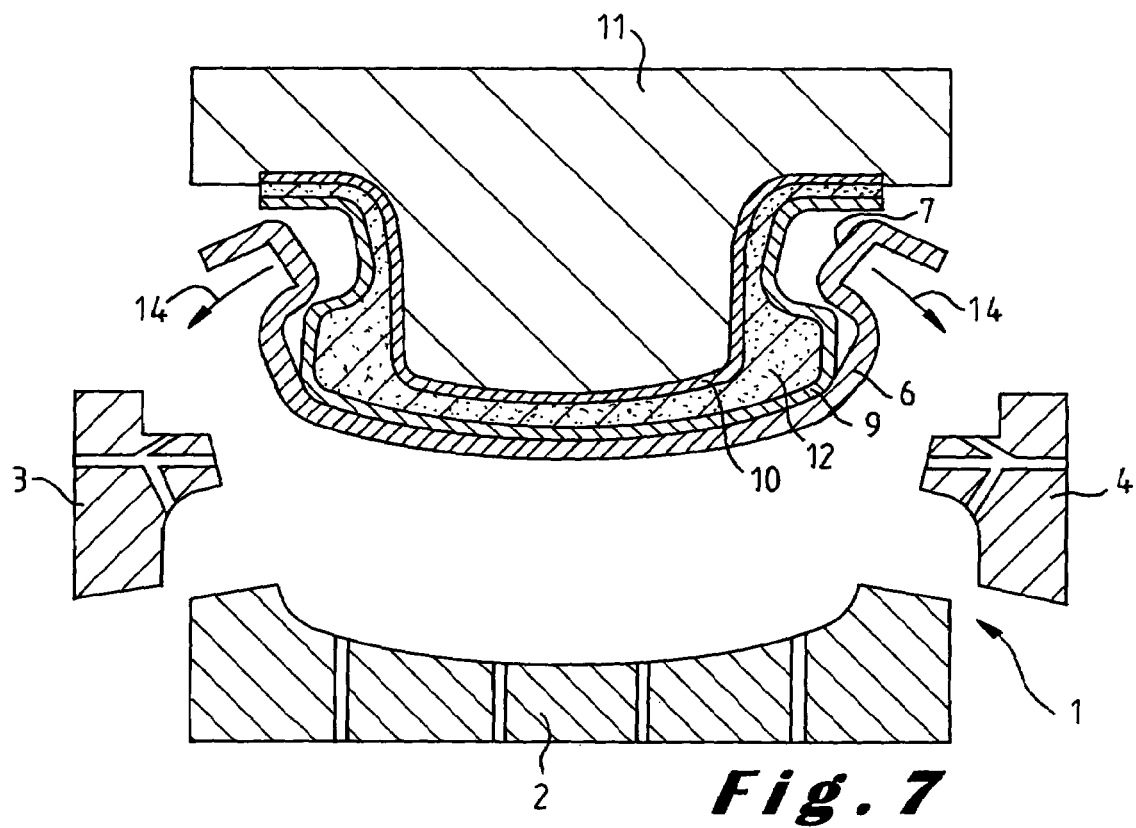
Figure 8:
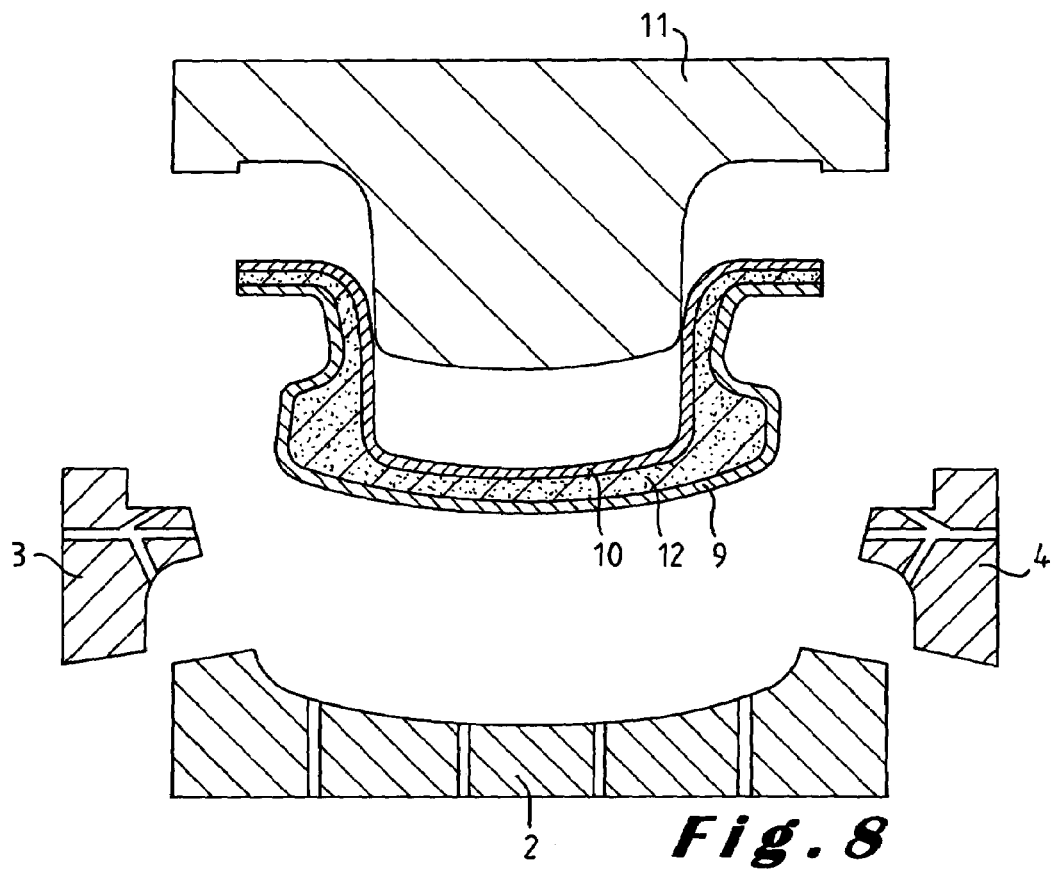

After having moulded the skin 9 and any optional backing layers, the moulded article is demoulded. As illustrated in FIG. 5, the slides 3 and 4 are first retracted according to arrows 13 and, as illustrated in FIG. 6, the upper mould part 11, having the moulded article and the flexible liner attached thereto, is removed from the lower mould part. In a next step, the flexible liner 6 is drawn of the moulded part, more particularly initially in the direction of arrows 14 shown in FIGS. 6 and 7. The liner 6 is made of an elastic material which has such an elasticity that it can easily be removed notwithstanding the presence of undercuts 15. Finally, the moulded article is removed from the upper mould part 11 as illustrated in FIG. 8.

In a variant embodiment of the demoulding steps illustrated in FIGS. 5 to 8, the upper mould part 11 is first removed leaving the liner 6 and the moulded article in the lower mould part 1. Subsequently, the slides 3, 4 can be retracted and the liner 6 can be drawn aside so that the moulded article can be removed without removing the liner 6 from the basic mould section 2. An advantage of this embodiment is that the liner has not to be repositioned entirely again in the mould before moulding the next article or trim part.

In the method illustrated in the Figures, a thicker foam layer 12 was applied in the undercuts 15 so that the structural backing layer 10 could easily be inserted in the lower mould part 1. However, the structural backing layer 10 could also extend within the undercuts 15. In order to enable to insert the structural backing layer in this case in the lower mould part 1, the slides 3 and 4 can be retracted and the flexible liner or hose, having the skin moulded thereon, drawn aside over a distance sufficient to allow insertion of the structural backing layer. Once inserted, the slides and the skin and liner can be brought back to their initial position.

In order to avoid the thicker foam layer in the undercuts 15 without having to draw aside the liner and skin layer, use can also be made of an upper mould section comprising one or more slides so that this mould part can be inserted in the lower mould part. The structural backing layer can then be moulded in the mould cavity formed between the back of the skin (or optionally of the foam backing layer) and the upper mould part. Of course when spraying the structural backing layer as described hereabove, the thickness of the foam layer can also be reduced in the undercuts.

Figure 9:
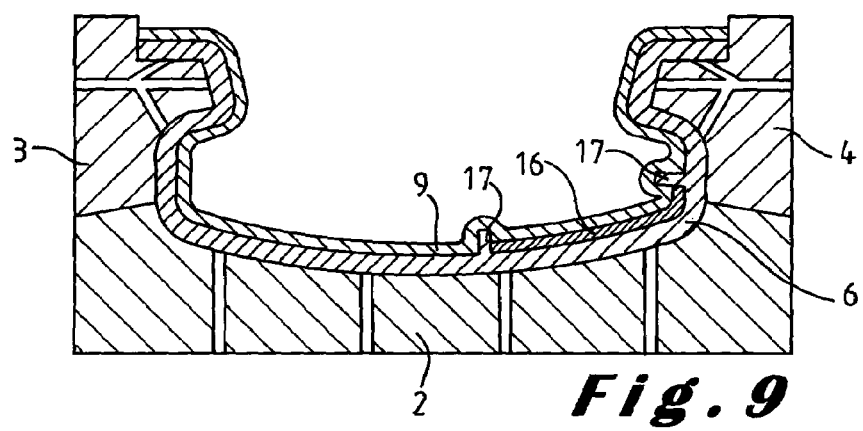

In FIG. 9 a particular embodiment of the present invention is illustrated wherein, before moulding the skin layer 9, a pre-manufactured insert 16 is positioned on the mould surface 7 formed by the flexible liner 6. In order to avoid penetration of the skin material between the front of the insert 16 and the flexible liner 6, this liner is provided with upstanding edges 17 which abut the peripheral edge of the insert 16 when positioning it between the upstanding edges thereby forming a seal.

From the above description of some particular embodiments of the method and the mould according to the invention, it will be clear that many modifications can be applied thereto without departing from the scope of the invention as defined in the appended claims.

The invention claimed is:

1. A method for manufacturing a moulded article comprising at least an elastomeric polyurethane skin, showing a front and a back, and a structural backing layer, which method comprises the steps of:
providing a mould which has a mould surface and which comprises at least a first mould part comprising at least two mutually movable mould sections forming at least one seam and showing at least one undercut, and a removable flexible liner which is made of an elastic material;
positioning the flexible liner onto said mould sections to cover at least partially said seam and to form at least a portion of said mould surface which has a generally concave shape;
applying at least one reactive polyurethane mixture to said mould surface to mould said skin with its front against this mould surface;
uniting the structural backing layer to the back of the skin;
moving the mutually movable mould sections away from one another while leaving the flexible liner onto the moulded article;
removing the moulded article from the mould and the flexible liner from the moulded article; and
repositioning the flexible liner onto said mould sections and again moulding a skin against the mould surface.

2. A method according to claim 1, wherein the step of removing the moulded article from the mould comprises the step of removing the moulded article together with the flexible liner from the mutually movable mould sections and the step of removing the flexible liner from the moulded article.

3. A method according to claim 1, wherein said reactive mixture is sprayed against said first mould part.

4. A method according to claim 1, wherein said mould comprises at least a second mould part co-operating with the first mould part to form a closed mould cavity wherein said reactive polyurethane mixture is applied in accordance with a reaction injection moulding (RIM) process.

5. A method according to claim 4, wherein said reactive polyurethane mixture comprises a blowing agent and is formulated to produce a polyurethane foam showing said skin as an integral skin moulded against said mould surface.

6. A method according to claim 1, wherein said reactive polyurethane mixture is formulated to produce an elastomeric, non-cellular or micro-cellular polyurethane skin having a density higher than 400 kg/m$^3$.

7. The method according to claim 6, wherein said density is higher than 700 kg/m$^3$.

8. A method according to claim 1, wherein before moving the mutually movable mould sections away from one another to remove the moulded article from the mould, at least a first backing layer is moulded against the back of the moulded skin.

9. A method according to claim 8, wherein the step of moulding said first backing layer comprises applying a foamable composition for obtaining a foam material against the back of the moulded skin.

10. A method according to claim 9, wherein said foamable composition is applied between the moulded skin and said structural backing layer which is positioned on the back side of the skin, the foam material obtained from the foamable composition uniting the structural backing layer to the back of the moulded skin.

11. A method according to claim 9, wherein before moving the mutually movable mould sections away from one another to remove the moulded article from the mould, said structural backing layer is moulded against the back of the foam layer.

12. A method according to claim 1, wherein said flexible liner is pre-shaped in accordance with the shape of the front of the skin.

13. A method according to claim 12, wherein said flexible liner comprises a moulded silicone liner.

14. A method according to claim 1, wherein said flexible liner shows, on its side against which the skin is moulded, a predetermined texture and/or grain.

15. A method according to claim 1, wherein said flexible liner has an average thickness of between 0.03 and 15 mm.

16. The method according to claim 15, wherein said average thickness is between 0.05 and 5 mm.

17. A method according to claim 1, wherein before applying the reactive polyurethane mixture to the surface of said first mould part to mould said skin, an in-mold coating is applied to this surface.

18. A method according to claim 1, wherein before applying the reactive polyurethane mixture to the surface of said first mould part to mould said skin, an insert is positioned on the mould surface formed by the flexible liner, the insert showing at least one peripheral edge by means of which it is positioned in abutment to at least one upstanding edge provided on the flexible liner.

19. The method according to claim 1, wherein before moving the mutually movable mould sections away from one another to remove the moulded article from the mould, said structural backing layer is moulded against the back of the moulded skin.

20. A method according to claim 19, wherein said structural backing layer made of a rigid material.

21. A method for manufacturing a moulded article comprising at least an elastomeric polyurethane skin, showing a front and a back, and a structural backing layer, which method comprises the steps of:
providing a mould with at least a first mould part comprising at least two mutually movable mould sections forming at least one seam and showing at least one undercut;
positioning a removable flexible liner, which has an average thickness of between 0.03 and 15 mm and which is made of an elastic material, onto said mould sections to cover at least partially said seam;

applying a vacuum to suck the flexible liner against said mould sections;

spraying at least one reactive polyurethane mixture onto a surface of said first mould part, which is at least partially formed by said flexible liner, to mould said skin with its front against the mould surface;

uniting the structural backing layer to the back of the skin;

moving the mutually movable mould sections away from one another while leaving the flexible liner on the moulded article;

removing the moulded article from the mould and the flexible liner from the moulded article; and repositioning the flexible liner onto said mould sections and manufacturing a next moulded article.

22. A method according to claim 21, wherein said mould surface has a generally concave shape.

23. A method according to claim 21, wherein the step of removing the moulded article from the mould comprises the step of removing the moulded article, together with the flexible liner from the mutually movable mould sections, and the step of removing the flexible liner from the moulded article.

24. A method according to claim 21, wherein said reactive polyurethane mixture is formulated to produce an elastomeric, non-cellular or micro-cellular polyurethane skin having a density higher than 400 kg/m$^3$.

25. The method according to claim 24, wherein said density is higher than 700 kg/m$^3$.

26. A method according to claim 21, wherein said flexible liner is pre-shaped in accordance with the shape of the front of the skin.

27. A method according to claim 26, wherein said flexible liner comprises a moulded silicone liner.

28. A method according to claim 21, wherein said flexible liner shows, on its side against which the skin is moulded, a predetermined texture and/or grain.

29. A method according to claim 21, wherein, before applying the reactive polyurethane mixture to the surface of said first mould part to mould said skin, an in-mold coating is applied to this surface.

30. A method according to claim 21, wherein, before applying the reactive polyurethane mixture to the surface of said first mould part to mould said skin, an insert is positioned on the mould surface formed by the flexible liner, the insert showing at least one peripheral edge by means of which it is positioned in abutment to at least one upstanding edge provided on the flexible liner.

31. The method according to claim 21, wherein said average thickness is between 0.05 and 5 mm.

* * * * *